(No Model.)

W. H. KNAPP.
GRAIN CARRIER.

No. 410,526. Patented Sept. 3, 1889.

Witnesses:
Walter S. Wood
Hampden Kelsey

Inventor.
William H. Knapp
By Lucius C. West
Atty

UNITED STATES PATENT OFFICE.

WILLIAM H. KNAPP, OF GALESBURG, MICHIGAN.

GRAIN-CARRIER.

SPECIFICATION forming part of Letters Patent No. 410,526, dated September 3, 1889.

Application filed March 26, 1889. Serial No. 304,812. (No model.)

*To all whom it may concern:*

Be it known that I, WILLIAM H. KNAPP, a citizen of the United States, residing at Galesburg, county of Kalamazoo, State of Michigan, have invented a new and useful Grain-Carrier, of which the following is a specification.

This invention has for its object certain improvements in grain carriers and elevators in which sprocket-chains and slats attached thereto are employed.

Figure 1:
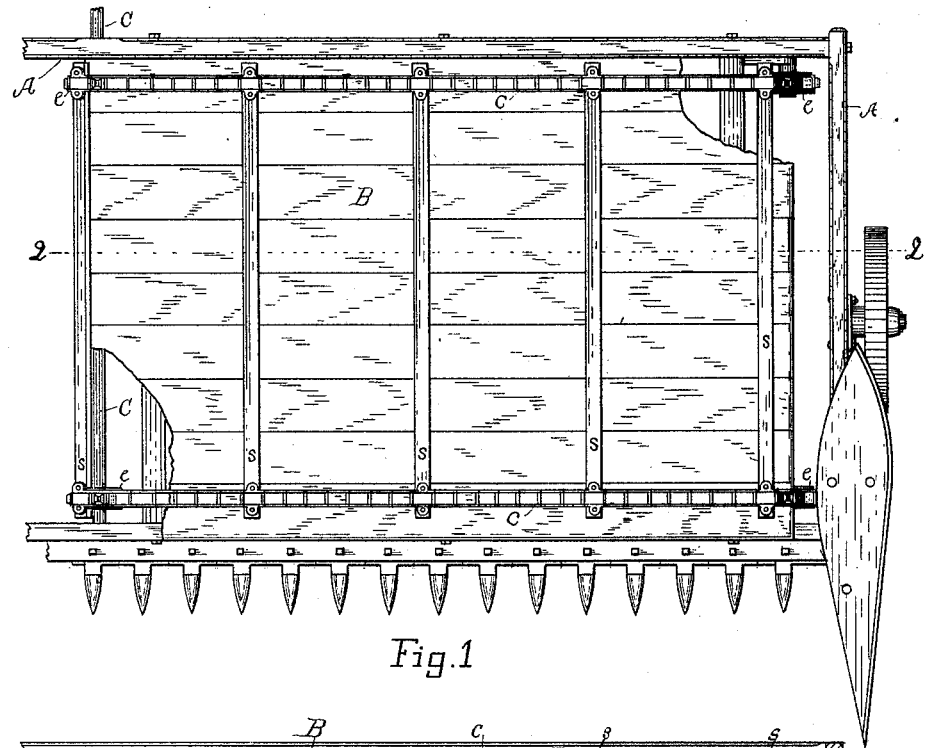
Figure 2:
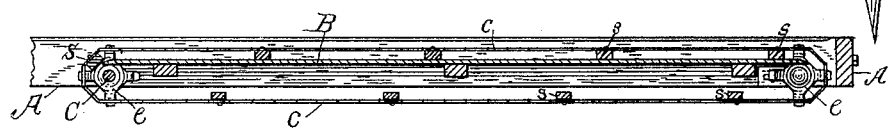

In the drawings forming a part of this specification, Figure 1 is a plan view, and Fig. 2 a longitudinal section on dotted line 2 2 in Fig. 1.

Referring to the lettered parts of the drawings, A is a frame of the grain-platform B behind a cutter-bar or sickle, as in ordinary harvesters. At each of the four corners of the platform B is a sprocket-wheel $e$, and the two sprocket-wheels at the end where the power is applied are attached to a power-shaft C, to which shaft, when the machine is in use, power is applied from the harvesting-machine. (Not here shown.) Upon the sprocket-wheels $e$ are the chains $c\ c$.

It will be observed that the carrier-cleats S S are attached at the ends to the under sides of the chains $c\ c$—that is, the inside or the under side of that portion of the chains which are above the platform B, Fig. 2. By this means the carrier-slats S S contact directly with the platform B and carry or slide the grain along over the upper surface of the floor of the platform B. It will be seen that the sprocket-wheels are recessed between the sprockets to receive the slats S as they are carried around the wheels $e$, as shown at the left hand of Fig. 2.

While this apparatus is illustrated as a grain-carrier on a horizontal plane, it may be used to elevate grain up an incline to a binding-table above the grain-platform B.

Having thus described my invention, what I claim as new, and desire to secure by Letters Patent of the United States, is—

The combination of a platform, sprocket-wheels at the four corners, sprocket-chains on said wheels at the sides of the platform, said wheels being recessed between the sprockets to receive the slats, and slats attached at the ends to the side of the chains which engage the wheels, whereby the slats move the grain along the upper surface of the floor of the platform and in contact therewith, substantially as set forth.

In testimony of the foregoing I have hereunto subscribed my name in presence of two witnesses.

WILLIAM H. KNAPP.

Witnesses:
ARTHUR M. RANSOM,
FRANK McGRAW.